United States Patent [19]

Arnoldi et al.

[11] Patent Number: 5,218,041
[45] Date of Patent: Jun. 8, 1993

[54] POLYOXYMETHYLENE MOLDING MATERIALS HAVING IMPROVED THERMAL STABILITY AND REDUCED FORMALDEHYDE EMISSION

[75] Inventors: Detlef Arnoldi, Hanau; Edwin Nun, Brachttal, both of Fed. Rep. of Germany

[73] Assignee: Degussa Aktiengesellschaft, Fed. Rep. of Germany

[21] Appl. No.: 772,244

[22] Filed: Oct. 7, 1991

[30] Foreign Application Priority Data

Oct. 8, 1990 [DE] Fed. Rep. of Germany ....... 4031794

[51] Int. Cl.$^5$ .......... C08L 61/00; C08K 5/13; C08K 3/04
[52] U.S. Cl. .................... 524/593; 524/291; 524/424; 525/155; 525/400
[58] Field of Search ............ 524/593, 291, 424; 525/400, 155

[56] References Cited

U.S. PATENT DOCUMENTS

| | | | |
|---|---|---|---|
| 3,642,940 | 2/1972 | Burg et al. | 525/155 |
| 4,000,216 | 12/1976 | Lang | 525/66 |
| 4,672,083 | 6/1987 | Amann et al. | 524/86 |
| 4,837,400 | 6/1989 | Walter et al. | 524/593 |
| 4,987,174 | 1/1991 | Ying et al. | 524/593 |

FOREIGN PATENT DOCUMENTS

| | | |
|---|---|---|
| 0192356 | 8/1986 | European Pat. Off. . |
| 0381943 | 8/1990 | European Pat. Off. . |
| 0386597 | 9/1990 | European Pat. Off. . |
| 3518375 | 7/1986 | Fed. Rep. of Germany . |

Primary Examiner—Paul R. Michl
Assistant Examiner—Tae H. Yoon
Attorney, Agent, or Firm—Cushman, Darby & Cushman

[57] ABSTRACT

Polyoxymethylene molding materials having improved thermal stability and reduced formaldehyde emission consisting essentially of a polyoxymethylene as the main component and containing in addition, relative in each instance to the weight of the polyoxymethylene, 0.1 to 10% by weight of an endocopolymerizate, 0.05 to 3% by weight of a phenolic antioxidant, 0 to 5% by weight carbon black and 0 to 3% by weight of further additives customary in polyoxymethylene molding materials.

4 Claims, No Drawings

POLYOXYMETHYLENE MOLDING MATERIALS HAVING IMPROVED THERMAL STABILITY AND REDUCED FORMALDEHYDE EMISSION

The present invention relates to polyoxymethylene molding materials which have improved thermal stability and reduced formaldehyde emission. The polymers contain essentially at least one polyoxymethylene and additionally, relative in each instance to the weight of the polyoxymethylene, A) 0.1 to 10% by weight of an endocopolymerizate in which cross-linked polymer particles consisting of
  a) 95 to 99.9% by weight of at least one monoethylenically unsaturated monomer selected from the group consisting of (meth)acrylic acid esters and vinyl aromatics and
  b) 0.1 to 5% by weight of at least one multiply ethylenically unsaturated monomer in a continuous phase of a non-cross-linked polymerizate consisting of at least one monomer selected from the group consisting of (meth)acrylic acid esters and of vinyl aromatics
  are dispersed,
B) 0.05 to 3% by weight of at least a preferably phenolic antioxidant,
C) 0 to 5% by weight carbon black.

The molding materials of the invention have improved thermal stability and reduced formaldehyde emissions during thermoplastic processing, so that the tendency to form coatings on molds during injection molding processing is distinctly diminished. In addition, shaped articles produced from these molding materials have less gloss and improved printability.

The polyoxymethylenes forming the main component of the molding masses of the invention can be homopolymers of formaldehyde or of trioxane or they can be copolymers. They can have a linear structure or also they can be branched or cross-linked. They can be used individually or as mixtures.

The term homopolymers of formaldehyde or of trioxane denotes in this context such polymers whose hemiacetalic hydroxyl terminal groups are stabilized chemically against degradation, e.g. by means of esterification or etherification. The term copolymers denotes e.g. copolymers of trioxane and of at least one compound copolymerizable with trioxane.

Such compounds copolymerizable with trioxane are e.g. cyclic ethers having 3 to 5, preferably 3, ring members, cyclic acetals different from trioxane, especially formals, having 5 to 11, preferably 5 to 8 ring members, and linear polyacetals, especially polyformals. The named cocomponents are used e.g. in each instance in amounts of 0.01 to 20, preferably 0.1 to 10, especially 1 to 5% by weight.

In particular, compounds of the formula:

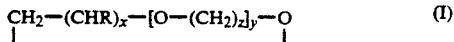

$$CH_2-(CHR)_x-[O-(CH_2)_z]_y-O \qquad (I)$$

are suitable as comonomers, in which formula R signifies a hydrogen atom, an alkyl group containing 1 to 6, preferably 1, 2 or 3 carbon atoms which can be substituted with 1, 2 or 3 halogen atoms, preferably chlorine atoms, an alkoxymethyl group having 2 to 6, preferably 2, 3 or 4 carbon atoms, a phenyl group or a phenoxymethyl group, x is a whole number from 1 to 3, in which case y is equal to zero, y is a whole number from 1 to 3, in which case x is equal to zero and z is equal to 2, and z is a whole number from 3 to 6, preferably 3 or 4, in which case x is equal to zero and y is equal to 1.

Suitable cyclic ethers are in particular epoxides, e.g. ethylene oxide, styrene oxide, propylene oxide or epichlorohydrin as well as glycidyl ethers from mono or polyvalent alcohols or phenols.

Suitable cyclic acetals are in particular cyclic formals of aliphatic or cycloaliphatic α,ω diols with 2 to 8, preferably 2, 3 or 4 carbon atoms whose carbon chain can be interrupted at intervals of 2 carbon atoms by an oxygen atom, e.g.

Glycol formal (1,3-dioxolane),
Propane diol formal (1,3-dioxane),
Butane diol formal (1,3-dioxepane) and
Diglycol formal (1,3,6-trioxocane), as well as
4-chloromethyl-1,3-dioxolane,
Hexane diol formal (1,3-dioxonane) and
Butene diol formal (1,3-dioxacycloheptene-5).

However, diformals, e.g. diglycerine diformal, are also suitable, especially for the production of terpolymers of trioxane.

Suitable linear polyacetals are both homo or copolymers of the cyclic acetals defined above as well as linear condensates from aliphatic or cycloaliphatic α,ω diols with aliphatic aldehydes or thioaldehydes, preferably formaldehyde. In particular, homopolymers of cyclic formals from aliphatic α,ω diols with 2 to 8, preferably 2, 3 or 4 carbon atoms are used, e.g. poly-(1,3-dioxolane), poly-(1,3-dioxane) and poly-(1,3-dioxepane).

The values for the viscosity number of the polyoxymethylenes used in accordance with the invention (measured with a solution of the polymer in hexafluoroisopropanol, adjusted with methanolic sodium hydroxide solution to pH 8 to 9, at 25° C. in a concentration of 0.3 g/100 ml) should generally be at least 160 (ml/g). The crystallite melting points of the polyoxymethylenes are in a range from 140° to 180° C., preferably 150° to 170° C. and their densities are 1.38 to 1.45 g×ml$^{-1}$, preferably 1.40 to 1.43 g×ml$^{-1}$ (measured according to DIN 53 479). The preferably binary or ternary trioxane copolymers used in accordance with the invention are prepared in a known manner by means of polymerizing the monomers in the presence of cationically active catalysts at temperatures between 0° and 150° C., preferably between 70° and 140° C. (cf. e.g. published German patent application DE-AS 14 20 283). Examples of catalysts used in this connection are Lewis acids such as boron trifluoride or antimony pentafluoride, and complex compounds of such Lewis acids, preferably etherates, e.g. boron trifluoride diethyl etherate or boron trifluoride-ditert.-butyl etherate. Furthermore, the following are suitable: Protonic acids, e.g. perchloric acid as well as salt-like compounds, e.g. triphenylmethylhexafluorophosphate or triethyloxonium tetrafluoroborate, acetylperchlorate or esters of perchloric acid, e.g. methoxymethylperchlorate or tert.-butyl perchlorate. In order to regulate the molecular weight, all substances can be used which are known to act as chain-transfer agents in the polymerization of trioxane. The polymerization can take place in mass, suspension or solution. In order to remove unstable components, the copolymers can be subjected to a thermally or hydrolytically controlled partial degradation down to primary alcohol terminal groups (cf. e.g. published German patent applications DE-AS 14 45 273 and DE-AS 14 45 294).

The homopolymers of formaldehyde or of trioxane used in accordance with the invention are likewise prepared in a known manner by means of a catalytic polymerization of the monomer (cf. e.g. DE-AS 10 37 705 and DE-AS 11 37 215).

The endocopolymerizates A) contained in the molding materials of the invention in an amount of 0.1 to 10% by weight, relative to the weight of the polyoxymethylene, are cross-linked, spherical polymer particles which are dispersed in a continuous phase of a non-cross-linked polymerizate. The cross-linked polymer particles are produced by means of the copolymerization of a) 95 to 99.9% by weight of at least one monoethylenically unsaturated monomer from the group of (meth)acrylic acid esters and of vinyl aromatics with b) 0.1 to 5% by weight of at least one multiply ethylenically unsaturated monomer.

Especially suitable, monoethylenically unsaturated monomers are the esters of methacrylic acid and of acrylic acid with a saturated aliphatic or cycloaliphatic alcohol with 1 to 8 carbon atoms such as methyl acrylate, methyl methacrylate, ethyl acrylate, ethyl methacrylate, butyl acrylate, butyl methacrylate, tert. butyl methacrylate, 2,2-dimethylpropyl acrylate (neopentyl acrylate), 2,2-dimethylpropyl methacrylate (neopentyl methacrylate), cyclohexyl acrylate or cyclohexyl methacrylate; with monoetherified diols of the general formula

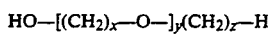

$$HO-[(CH_2)_x-O-]_y(CH_2)_z-H \qquad (II),$$

in which x is equal to 2 to 20, preferably 2 to 12, y is equal to 1 to 10, preferably 1 to 4, and z is equal to 1 to 20, preferably 1 to 4, such as ethylene glycol monomethylether acrylate, ethylene glycol monomethylether methacrylate, triethylene glycol monomethylether acrylate and triethylene glycol monomethylether methacrylate; with a phenol having 6 to 14 carbon atoms such as phenyl acrylate, phenyl methacrylate, 1-naphthyl acrylate, 2-naphthyl acrylate, 1-naphthyl methacrylate, 2-naphthyl methacrylate, 1-anthracenyl acrylate and 1-anthracenyl methacrylate; with substituted phenols such as o-cresyl acrylate, m-cresyl acrylate, p-cresyl acrylate, o-cresyl methacrylate, m-cresyl methacrylate, p-cresyl methacrylate, 4-methoxyphenyl acrylate (hydroquinone monomethylether acrylate) and 2-methoxyphenyl acrylate (catechol methacrylate); or with an aromatic-aliphatic alcohol with 7 to 22 carbon atoms such as benzyl acrylate, benzyl methacrylate, 3-phenylpropyl acrylate and 3-phenylpropyl methacrylate; and the vinyl aromatics such as styrene or substituted styrenes and vinyl naphthalines or substituted vinyl naphthalines. Especially suitable multiply ethylenically unsaturated monomers are di(meth)acrylic acid esters with glycols having approximately 2 to 10 carbon atoms such as ethylene glycol dimethacrylate, tetraethylene glycol dimethacrylate and ethylene glycol diacrylate; divinyl compounds such as divinyl benzene or divinyl ethers of the above-mentioned glycols, di and triallyl compounds such as diallyl phthalate or triallyl cyanurate. However, other monomers containing at least two ethylenic double bonds can also be used in addition, such as divinyl pyridine, divinyl naphthaline, the divinyl toluenes, trivinyl benzenes, trivinyl naphthalines, divinyl carbonate, N,N'-divinyl ethylene urea or allyl esters of polyvalent carboxylic acids, e.g. diallyl succinate, diallyl carbonate, diallyl tartrate or triallyl citrate, or triallyl phosphate.

The preparation of endocopolymerizates A) is described e.g. in German patent DE 21 46 628. It takes place in such a manner that the polymer functioning as continuous phase of a non-cross-linked polymerizate is dissolved in a mixture of the monoethylenically unsaturated monomer and of the multiply ethylenically unsaturated monomer and the radical polymerization of the latter mixture is then initiated. A phase separation takes place and the spherical, cross-linked polymer particles are produced as a dispersion in the originally-used, soluble polymerizate. The endocopolymerization can be undertaken e.g. as emulsion polymerization or as bulk polymerization. However, suspension polymerization is particularly advantageous because equal endocopolymerizates with a particle diameter between 0.1 and 15 μm are produced which are particularly well-suited for use in the molding materials of the invention.

The multiply ethylenically unsaturated monomer is preferably used in an amount between 0.3 and 2% by weight, relative to the weight of the endocopolymerizate to be prepared. In addition, endocopolymerizate A) advantageously contains 50 to 85, preferably 65 to 85% by weight of cross-linked polymer particles and 15 to 50, preferably 15 to 35% by weight non-cross-linked polymerizate.

In order to protect against the damaging action of atmospheric oxygen, especially at elevated temperatures, the molding materials of the invention must also contain 0.05 to 3% by weight, relative to the weight of the polyoxymethylene, of at least one antioxidant as component B); phenolic antioxidants are especially suitable, in particular those with 2 to 6 hydroxyphenyl groups in the molecule like those described e.g. in German patent DE 25 40 207.

They can also contain up to 5% by weight of carbon black as component C). The carbon black can be admixed as powder, in beaded form or as concentrate, preferably in a polyoxymethylene matrix.

The ageing of polyoxymethylene molding materials is accelerated by light, especially by the UV components of sunlight which reach the earth. As a countermeasure, the penetration of light must be reduced or, better yet, prevented. Carbon blacks often act, independently of concentration and BET surface, together with organic UV absorbers as UV stabilizers for polyoxymethylenes.

Other different functional groups, usually containing oxygen, are located on the surface of the carbon-black particles—for example, carbonyl groups can be demonstrated. These groups are responsible for different pH's of the carbon blacks, determined according to DIN ISO 787/11. In order not to damage polyoxymethylenes by acid-catalyzed acetal splittings, only carbon blacks should be used whose $pH \geq 8$. The BET surface of the carbon blacks is independent thereof and can be freely selected for the particular application of the molding materials of the invention.

Finally, the molding materials of the invention can contain still other additives customary in polyoxymethylene molding materials, the amount of which, relative to the weight of the polyoxymethylene, is preferably up to 3% by weight. Examples for such other additives are known heat stabilizers, e.g. condensation products of carboxylic acid amides such as oxalic acid-, malonic acid-, isophthalic acid-, terephthalic acid diamide and trimesic acid triamide, difficulty voltile s-triazine derivatives such as melam, melem and melon, condensation products of melamine and formaldehyde and UV absorbers and light stabilizers, e.g. 2-(2'-hydroxyphenyl)- benzotriazols, 2,4-bis-(2'-hydroxyphenyl)-6-alkyl-s-triazines, 4-hydroxybenzophenones, 1,3-bis-(2'-hydroxybenzoyl)-benzol derivatives and oxalic acid diamides such as oxalic acid dianilide.

The molding materials of the invention are produced by mixing and then homogenizing the components, which are advantageously present primarily in a powder or granulated form. However, individual components can also be added in solution or in disperse form, either in the mixing device or later in the homogenizing device.

The mixing normally takes place at room temperature, preferably at a temperature of 15° to 30° C. and the homogenization takes place in any heatable mixing devices, e.g. rollers, calenders, kneaders or extruders, at a temperature above the crystallite melting point of the polyoxymethylene, that is, at a temperature of 150° to 260° C., preferably 170° to 220° C.

The following examples and reference tests are intended to illustrate the invention and demonstrate the advantageous action of the endocopolymerizates used in standard polyoxymethylenes.

The percentages indicated in the examples are percentages by weight, relative in the analysis in each instance to the total molding material, otherwise to the polyoxymethylene. The thermal stabilities under nitrogen ($N_2$) and air are determined as weight loss (GV) after 2 hours at 220° C. The MFI (melt flow index) is determined at 190° C. and 2.16 kp load.

The indicated formaldehyde concentrations are determined as follows: Immediately after the injection molding with a mass temperature of 193° C. and a tool temperature of 90° C., a dump bell which is still hot is removed from the tool and transferred into a closed 10 liter container. After 2 minutes, the formaldehyde concentration in the air space is determined. The surface gloss is determined according to DIN 67 530 using round disks 60 mm in diameter and 2 mm thick and is indicated in scale parts (Skt). The round disks are also formed at a mass temperature of 193° C. and a tool temperature of 90° C. with a pressure of 50 bars.

Materials used:

A) Polyoxymethylenes (POM):

POM 1: Copolymer of trioxane and 1,3-dioxepane with approximately 2.0% comonomer component, already stabilized with 0.3% triethylene glycol-bis-(3-tert. butyl-5-methyl-4-hydroxyphenyl)-propionate as antioxidant. MFI: 8 to 10 g/10 min.

POM 2: Copolymer of trioxane and 1,3-dioxepane with approximately 2.55% comonomer component, already stabilized with 0.3% triethylene glycol-bis-(3-tert. butyl-5-methyl-4-hydroxyphenyl)-propionate as antioxidant. MFI: 8 to 10 g/10 min.

B) Endocopolymerizates (ENDO):

ENDO 1: 73.86% cross-linked polymer particles consisting of 62.17% styrene, 37.01% n-butyl acrylate and 0.82% tetraethylene glycol dimethacrylate, dispersed in 26.14% of a non-cross-linked, high-molecular polymerizate of methyl methacrylate.

ENDO 2: 75.15% cross-linked polymer particles consisting of 60.84% styrene, 38.36% n-butyl acrylate and 0.8% tetraethylene glycol dimethacrylate, dispersed in 24.85% of a non-cross-linked copolymerizate of 60% methyl methacrylate and 40% n-butyl methacrylate.

ENDO 3: 73.86% cross-linked polymer particles consisting of 62.17% styrene, 37.01% n-butyl acrylate and 0.82% tetraethylene glycol dimethacrylate, dispersed in 26.14% of a 1:1 mixture of a non-cross-linked, high-molecular polymerizate of methyl methacrylate and of a non-cross-linked copolymerizate of 78% methyl methacrylate and 22% n-butyl acrylate.

C) Carbon black:

Furnace black with a BET surface of approximately 300 $m^2/g$ as 12.5% concentrate in polyoxymethylene as matrix, granulated, with a pH of $10 \pm 1.5$.

D) Other additive:

Fine, cross-linked melamine-formaldehyde condensate (MFK).

REFERENCE TEST A AND EXAMPLES 1 TO 3

The components POM2, ENDO1, ENDO2, MFK and carbon black were mixed in the weight ratios indicated in Table 1, relative, in each instance, to POM2, melted and homogenized in a two-shaft extruder of the type ZDS-K28 and the homogenized mixture was regranulated. The thermal stabilities were determined using the granular material, the surface gloss using the test pieces described above. The results are collated in Table 1:

TABLE 1

| Reference test or example | ENDO 1 (%) | ENDO 2 (%) | MFK (%) | Carbon black (%) | GV-$N_2$ (%) | GV-air (%) | Gloss (Skt) |
|---|---|---|---|---|---|---|---|
| a | 0 | 0 | 0.15 | 0.2 | 0.51 | 1.70 | 83.7 |
| 1 | 1 | 0 | 0.15 | 0.2 | 0.37 | 1.35 | 71.7 |
| 2 | 6 | 0 | 0.15 | 0.2 | 0.23 | 1.10 | 36.2 |
| 3 | 0 | 2 | 0.15 | 0.2 | 0.19 | 1.04 | 35.7 |

REFERENCE TEST B AND EXAMPLES 4 TO 7

The components POM2, ENDO2, ENDO3, MFK and carbon black were mixed in the weight ratios indicated in Table 2, relative in each instance to POM2, homogenized in a two-shaft extruder and the homogenized mixture was regranulated. The tests were carried out as above. The results are given in Table 2:

TABLE 2

| Reference test or example | ENDO 2 (%) | ENDO 3 (%) | MFK (%) | Carbon black (%) | GV-$N_2$ (%) | GV-air (%) | Gloss (Skt) |
|---|---|---|---|---|---|---|---|
| b | 0 | 0 | 0.15 | 0.2 | 0.64 | 2.02 | 77.6 |
| 4 | 0.5 | 0 | 0.15 | 0.2 | 0.48 | 1.31 | 71.2 |
| 5 | 4 | 0 | 0.15 | 0.2 | 0.38 | 1.01 | 41.9 |
| 6 | 0 | 1 | 0.15 | 0.2 | 0.29 | 0.95 | 69.6 |
| 7 | 0 | 4 | 0.15 | 0.2 | 0.17 | 0.70 | 32.6 |

REFERENCE TEST C AND EXAMPLE 8

The components POM2, ENDO3 and MFK were mixed in the weight ratios indicated in Table 3, relative in each instance to POM2, homogenized in a two-shaft extruder and the homogenized mixture was regranulated. The tests were carried out as above. The results are given in Table 3:

TABLE 3

| Reference test or example | ENDO 3 (%) | MFK (%) | GV-$N_2$ (%) | GV-air (%) | Gloss (Skt) |
|---|---|---|---|---|---|
| c | 0 | 0.15 | 0.30 | 1.09 | 80.3 |

TABLE 3-continued

| Reference test or example | ENDO 3 (%) | MFK (%) | GV-N$_2$ (%) | GV-air (%) | Gloss (Skt) |
|---|---|---|---|---|---|
| 8 | 2 | 0.15 | 0.23 | 0.94 | 39.6 |

REFERENCE TEST D AND EXAMPLE 9

The components POM2, ENDO3, carbon black and MFK were mixed in the weight ratios indicated in Table 4, relative in each instance to POM2, homogenized in a two-shaft extruder and the homogenized mixture regranulated. The tests were carried out as above. The results are given in Table 4:

TABLE 4

| Reference test or example | ENDO 3 (%) | MFK (%) | Carbon black (%) | GV-air (%) | Gloss (Skt) |
|---|---|---|---|---|---|
| d | 0 | 0.15 | 2 | >5 | >83 |
| 9 | 6 | 0.15 | 2 | 1.95 | 26.1 |

REFERENCE TEST E AND EXAMPLES 10 TO 12

The components POM2, ENDO2, MFK and carbon black were mixed in the weight ratios indicated in Table 5, relative in each instance to POM2, homogenized in a two-shaft extruder and the homogenized mixture was regranulated. The formaldehyde emission was determined as described above. The results are given in Table 5:

TABLE 5

| Reference test or example | ENDO 2 (%) | MFK (%) | carbon black (%) | formaldehyde emission (ppm) |
|---|---|---|---|---|
| e | 0 | 0.15 | 0.2 | 21.1 |
| 10 | 1 | 0.15 | 0.2 | 14.3 |
| 11 | 2 | 0.15 | 0.2 | 10.4 |
| 12 | 4 | 0.15 | 0.2 | 8.3 |

REFERENCE TEST F AND EXAMPLES 13 TO 14

The components POM1, ENDO3, MFK and carbon black were mixed in the weight ratios indicated in Table 6, relative in each instance to POM1, homogenized in a two-shaft extruder and the homogenized mixture was regranulated. The tests were carried out as above. The results are given in Table 6:

TABLE 6

| Reference test or example | ENDO 3 (%) | MFK (%) | Carbon Black (%) | GV-N$_2$ (%) | GV-air (%) |
|---|---|---|---|---|---|
| f | 0 | 0.15 | 0.2 | 0.74 | 4.58 |
| 13 | 4 | 0 | 0.2 | 0.49 | 3.26 |
| 14 | 4 | 0.15 | 0.2 | 0.50 | 2.21 |

REFERENCE TEST G AND EXAMPLES 15 TO 16

The components POM2, ENDO3, MFK and carbon black were mixed in the weight ratios indicated in Table 7, relative in each instance to POM2, homogenized in a two-shaft extruder and the homogenized mixture was regranulated. The tests were carried out as above. The results are given in Table 7:

TABLE 7

| Reference test or example | ENDO 3 (%) | MFK (%) | Carbon black (%) | GV-N$_2$ (%) | GV-air (%) |
|---|---|---|---|---|---|
| g | 0 | 0.15 | 0.2 | 0.75 | 4.60 |
| 15 | 4 | 0 | 0.2 | 0.26 | 1.56 |
| 16 | 4 | 0.15 | 0.2 | 0.28 | 1.37 |

REFERENCE TESTS H AND I AND EXAMPLE 17

The components POM2, ENDO3 and MFK were mixed in the weight ratios indicated in Table 8, relative in each instance to POM2, homogenized in a two-shaft extruder and the homogenized mixture was regranulated. The tests were carried out as above. The results are given in Table 8:

TABLE 8

| Reference test or example | ENDO 3 (%) | MFK (%) | GV-N$_2$ (%) | GV-air (%) |
|---|---|---|---|---|
| h | 0 | 0 | 0.31 | 2.59 |
| i | 0 | 0.15 | 0.28 | 2.15 |
| 17 | 4 | 0 | 0.14 | 0.98 |

What is claimed is:

1. Polyoxymethylene molding materials which have improved thermal stability and reduced formaldehyde emission, said molding materials containing at least one polyoxymethylene and, relative in each instance to the weight of the polyoxymethylene,
   A) 0.1 to 10% by weight of an endocopolymerizate in which cross-linked polymer particles consisting essentially of:
      a) 95 to 99.9% by weight of at least one monoethylenically unsaturated monomer selected from the group consisting of (meth)acrylic acid esters and of vinyl aromatics and
      b) 0.1 to 5% by weight of at least one multiply ethylenically unsaturated monomer in a continuous phase of a non-cross-linked polymerizate consisting essentially of at least one monomer selected from the group consisting of (meth)acrylic acid esters and vinyl aromatics are dispersed,
   B) 0.05 to 3% by weight of at least one antioxidant,
   C) 0 to 5% by weight carbon black.

2. A molding material as set forth in claim 1 in which the antioxidant is a phenolic antioxidant.

3. A polyoxymethylene molding material according to claim 1 or claim 2 in which the endocopolymerizate A) contains 50 to 85% by weight cross-linked polymer particles and 15 to 50% by weight non-cross-linked polymerizate.

4. A polyoxymethylene molding material according to claim 1 or claim 2 in which the average particle diameter of endocopolymerizate A) is 0.1 to 15 μm.

* * * * *